United States Patent
Rasbornig et al.

(10) Patent No.: US 11,994,387 B2
(45) Date of Patent: May 28, 2024

(54) INDUCTIVE SENSOR WITH IMPROVED SAFETY

(71) Applicant: Infineon Technologies AG, Neubiberg (DE)

(72) Inventors: Friedrich Rasbornig, Klagenfurt (AT); Dirk Hammerschmidt, Finkenstein (AT); Tobias Werth, Villach (AT)

(73) Assignee: Infineon Technologies AG, Neubiberg (DE)

( * ) Notice: Subject to any disclaimer, the term of this patent is extended or adjusted under 35 U.S.C. 154(b) by 478 days.

(21) Appl. No.: 17/301,746

(22) Filed: Apr. 13, 2021

(65) Prior Publication Data

US 2022/0326002 A1    Oct. 13, 2022

(51) Int. Cl.
  *G01B 7/30*  (2006.01)
  *G01L 3/10*  (2006.01)
  *G01L 5/22*  (2006.01)

(52) U.S. Cl.
  CPC .............. *G01B 7/30* (2013.01); *G01L 3/105* (2013.01); *G01L 5/221* (2013.01)

(58) Field of Classification Search
  CPC ............ G01B 7/30; G01L 3/105; G01L 5/221
  See application file for complete search history.

(56) References Cited

U.S. PATENT DOCUMENTS

| | | | |
|---|---|---|---|
| 8,453,518 B2 | 6/2013 | Diekmann et al. | |
| 9,614,478 B2* | 4/2017 | Nero, Jr. ................... | H03F 3/19 |
| 9,874,609 B2* | 1/2018 | Rasbornig .......... | G01R 31/3187 |
| 10,605,626 B2* | 3/2020 | Hammerschmidt ... | G01R 33/00 |
| 11,002,567 B2* | 5/2021 | Hammerschmidt ... | G01R 33/02 |
| 11,662,260 B2* | 5/2023 | Latham .................... | G01L 3/105 |
| | | | 73/862.331 |
| 11,692,887 B2* | 7/2023 | Witts ....................... | G01L 5/221 |
| | | | 73/862.331 |
| 11,733,288 B2* | 8/2023 | Gstoettenbauer ... | G06F 11/0796 |
| | | | 324/691 |
| 2020/0284615 A1* | 9/2020 | Hammerschmidt ..... | G01B 7/30 |
| 2022/0373318 A1* | 11/2022 | Rasbornig ............... | G01D 5/56 |
| 2022/0404135 A1* | 12/2022 | Hammerschmidt ..... | G01D 3/08 |
| 2022/0404136 A1* | 12/2022 | Hammerschmidt ..... | G01D 5/16 |
| 2023/0041763 A1* | 2/2023 | Park ....................... | G01D 18/00 |

FOREIGN PATENT DOCUMENTS

DE    102008017857 A1 *  10/2009    .......... G01D 5/2053

\* cited by examiner

*Primary Examiner* — Octavia Davis Hollington
(74) *Attorney, Agent, or Firm* — Harrity & Harrity, LLP

(57) ABSTRACT

An inductive sensor may include a first angle measurement path associated with determining an angular position based on a first set of input signals. The inductive sensor may include a second angle measurement path associated with determining an angular position based on a second set of input signals. The inductive sensor may include an amplitude regulation path associated with regulating amplitudes of a set of output signals. The inductive sensor may include a safety path associated with performing one or more safety checks. Each safety check of the one or more safety checks may be associated with at least one of the first angle measurement path, the second angle measurement path, or the amplitude regulation path.

20 Claims, 4 Drawing Sheets

INDUCTIVE SENSOR WITH IMPROVED SAFETY

BACKGROUND

An inductive sensor uses the principle of electromagnetic induction to determine a position (e.g., a linear position or an angular position) of an object. A general functioning principle of an inductive sensor is based on an alternating current (AC) signal being applied to an excitation coil which, in turn, induces signals in one or more receiving coils. An inductive coupling between the excitation coil and the one or more receiving coils depends on positions of components of the inductive sensor that move relative to each other—specifically on either the relative positions of the excitation coil and the one or more receiving coils (when the excitation coil or the one or more receiving coils are affixed to the object) or on a position of a rotor (e.g., a metallic or magnetic element that is affixed to the object) that moves relative to the excitation coil and the one or more receiving coils. The inductive coupling between the excitation coil an the one or more receiving coils therefore changes with the position of the object. The inductive sensor detects amplitude values or phase relationships of the signals induced in the one or more receiving coils and determines the position and/or one or more other characteristics of the object, accordingly.

SUMMARY

In some implementations, an inductive sensor includes a first angle measurement path associated with determining an angular position based on a first set of input signals; a second angle measurement path associated with determining an angular position based on a second set of input signals; an amplitude regulation path associated with regulating amplitudes of a set of output signals; and a safety path associated with performing one or more safety checks, wherein each safety check of the one or more safety checks is associated with at least one of the first angle measurement path, the second angle measurement path, or the amplitude regulation path.

In some implementations, a method includes receiving a plurality of signals on a safety path of an inductive sensor, wherein each signal of the plurality of signals is received from a first angle measurement path of the inductive sensor, a second angle measurement path of the inductive sensor, or an amplitude regulation path of the inductive sensor; and performing one or more safety checks on the safety path based on the plurality of signals, wherein each safety check of the one or more safety checks is associated with at least one of the first angle measurement path, the second angle measurement path, or the amplitude regulation path.

In some implementations, an inductive sensor includes a first measurement path associated with determining a position of a first object based on a first set of input signals; a second measurement path associated with determining a position of a second object based on a second set of input signals; an amplitude regulation path associated with regulating amplitudes of a set of output signals; and a safety path associated with assessing functionality of at least one of the first measurement path, the second measurement path, or the amplitude regulation path, wherein the first measurement path, the second measurement path, the amplitude regulation path, and the safety path are integrated on a monolithic semiconductor device.

DETAILED DESCRIPTION

Figure 1:
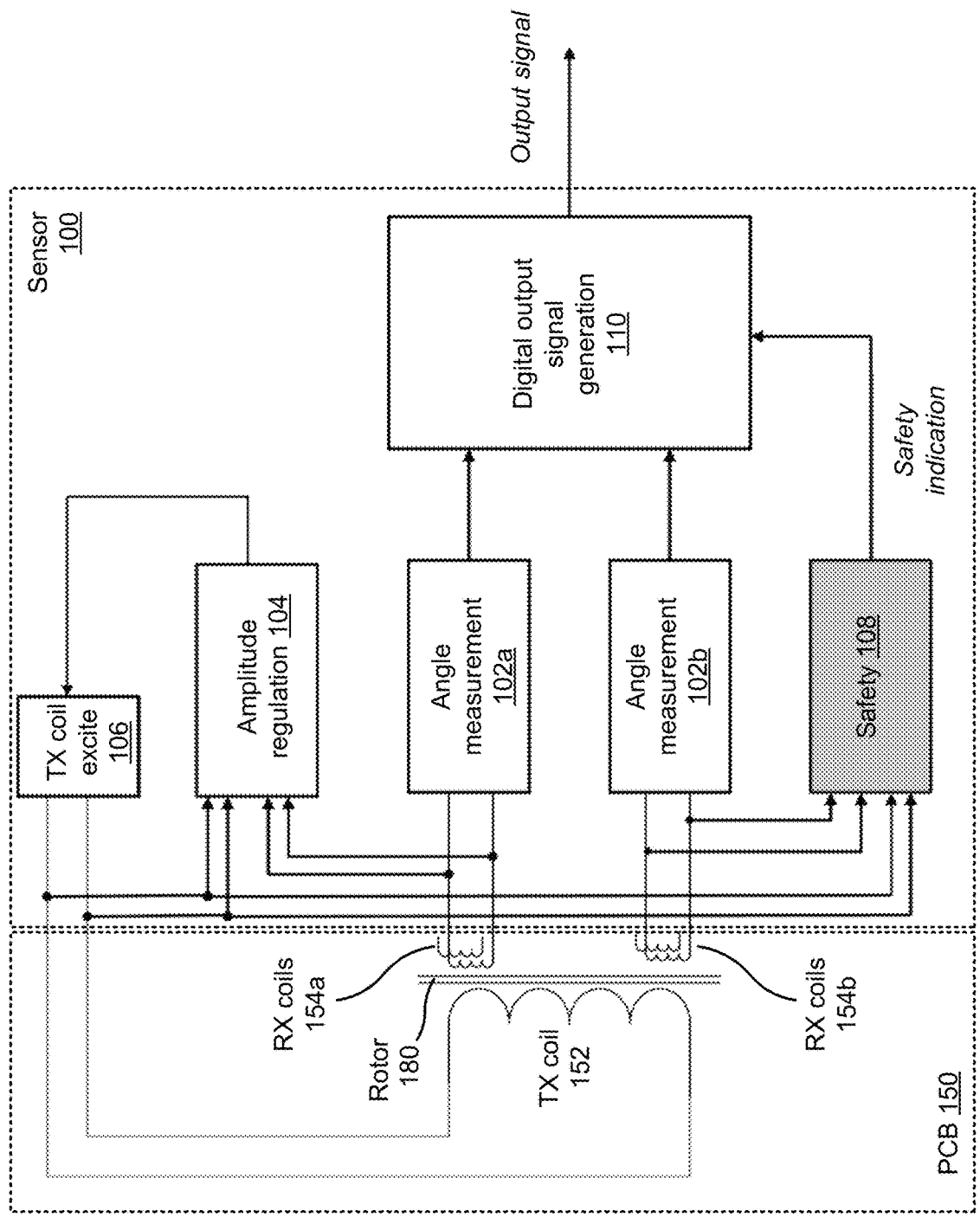
FIG. 1 is a block diagram illustrating an example inductive sensor with improved safety, as described herein.

The following detailed description of example implementations refers to the accompanying drawings. The same reference numbers in different drawings may identify the same or similar elements.

An inductive sensor may be designed to determine a position of an object and/or one or more other characteristics of the object in a given application. For example, an inductive sensor may be used in an electronic power steering (EPS) application to determine an angular position of a steering column and/or a torque applied to the steering column. In some applications, such as an EPS application, it may be necessary to ensure functional safety of the inductive sensor.

In general, functional safety can be defined as an absence of unreasonable risk (e.g., to a system, to an environment, to people, and/or the like) due to hazards caused by malfunctioning behavior (e.g., a systematic failure, a random failure, or the like) of the inductive sensor. In the automotive context, an Automotive Safety Integrity Level (ASIL) scheme is used to dictate functional safety requirements for an inductive sensor. The ASIL scheme is a risk classification scheme defined by the International Organization for Standardization (ISO) 26262 standard (titled Functional Safety for Road Vehicles), which provides a standard for functional safety of electrical and/or electronic systems in production automobiles. An ASIL classification defines safety requirements necessary to be in line with the ISO 26262 standard. An ASIL is established by performing a risk analysis of a potential hazard by looking at severity, exposure, and controllability of a vehicle operating scenario. A safety goal for that hazard in turn carries the ASIL requirements. There are four ASILs identified by the standard: ASIL A, ASIL B, ASIL C, ASIL D. ASIL D dictates the highest integrity requirements, while ASIL A dictates the lowest. A hazard with a risk that is low (and, therefore, does not require safety measures in accordance with ISO 26262) is identified as quality management (QM). In some cases, it is desirable or required that an inductive sensor achieves a high ASIL. For example, it may be desirable or required that an inductive sensor used in an electronic power steering (EPS) application achieves ASIL C or ASIL D. To ensure functional safety in an inductive sensor, as well as external coils utilized by the inductive sensor (e.g., an excitation coil and one or more receiving coils on an external printed circuit board (PCB)), a safety mechanism that allows malfunctioning behavior to be identified and signaled should be implemented.

Some implementations described herein provide an inductive sensor with improved safety. In some implementations, the inductive sensor includes a first angle measurement path associated with determining an angular position based on a first set of input signals, a second angle measurement path associated with determining an angular position based on a second set of input signals, and an amplitude regulation path associated with regulating amplitudes of a set of output signals. In some implementations, the inductive sensor includes a safety path associated with performing one or more safety checks, where each safety check of the one or more safety checks is associated with the first angle measurement path, the second angle measurement path, and/or the amplitude regulation path. Notably, in some implementations, the first angle measurement path, the second angle measurement path, the amplitude regulation path, and the safety path are integrated on a monolithic semiconductor device (e.g., on a single chip). Additional details are provided below.

FIG. 1 is a block diagram illustrating an example inductive sensor 100 with improved safety. As shown in FIG. 1, the inductive sensor 100 includes an angle measurement path 102a, an angle measurement path 102b, an amplitude regulation path 104, a transmitting (TX) coil excitation component 106, a safety path 108, and a digital output signal generation component 110. In some implementations, the angle measurement path 102a, the angle measurement path 102b, the amplitude regulation path 104, and the safety path 108 are integrated on a monolithic semiconductor device (e.g., a single chip). In some implementations, integration on the monolithic semiconductor device reduces a size and cost of inductive sensor 100 (e.g., as compared to a solution that utilizes a non-monolithic solution, such as a dual chip).

As shown in FIG. 1, various paths and components of the inductive sensor 100 are electrically connected to coils of a PCB 150 in order to enable the inductive sensor 100 to receive signals from or transmit signals to the coils of the PCB 150. For example, as shown in FIG. 1, the angle measurement path 102a and the amplitude regulation path 104 may be connected to a set of receiving (RX) coils 154a of the PCB 150 (e.g., to enable receipt of a first set of input signals associated with the set of RX coils 154a). Similarly, the angle measurement path 102b and the safety path 108 may be connected to a set of RX coils 154b (e.g., to enable receipt of a second set of receiving coils signals associated with the set of RX coils 154b). Further, the TX coil excitation component 106 is connected to the TX coil 152 (e.g., to enable the TX coil excitation component 106 to transmit a set of output signals to the TX coil 152).

Figure 2:
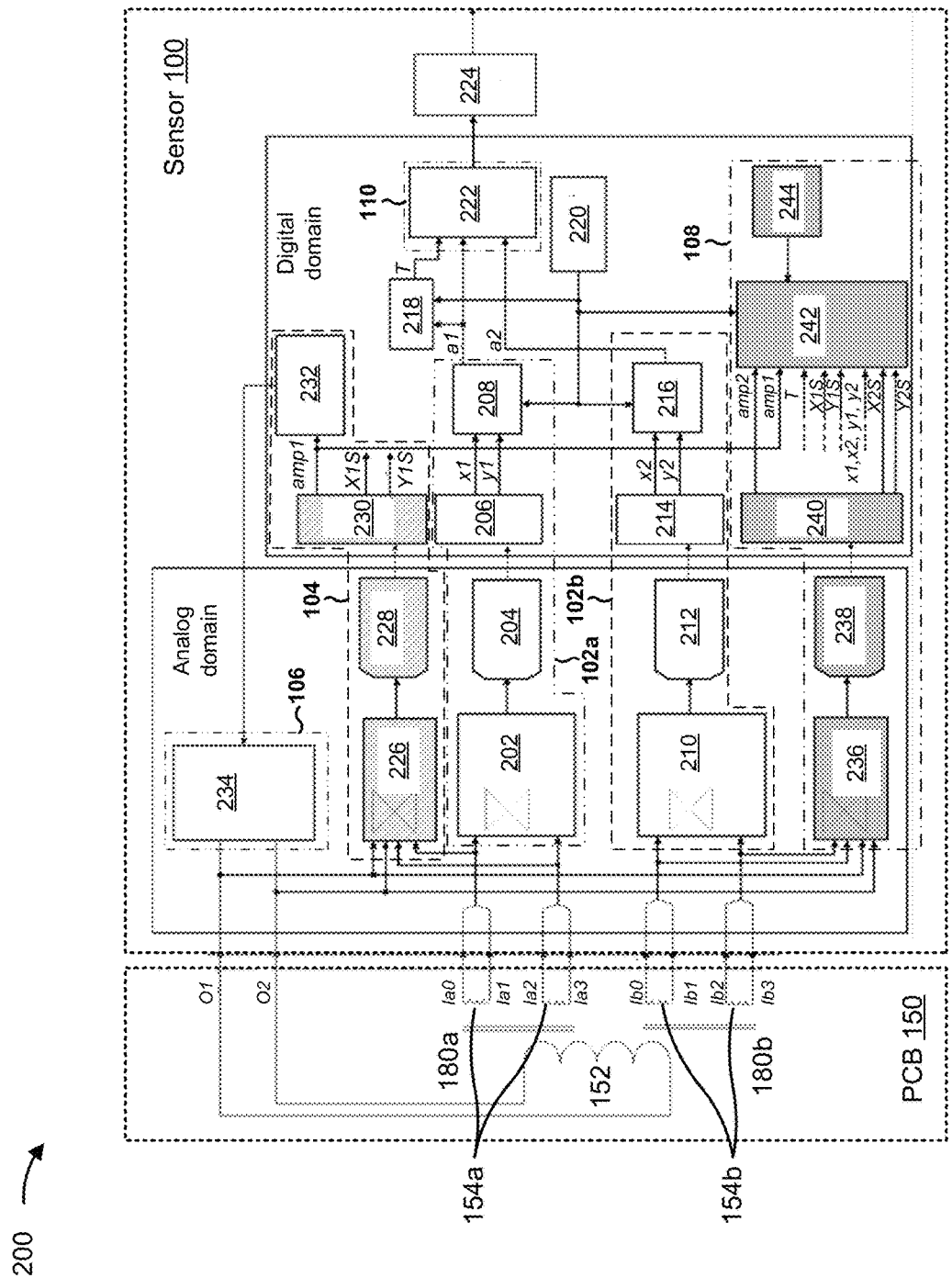
FIG. 2 is a block diagram illustrating a particular example implementation of the inductive sensor with improved safety shown in FIG. 1.

As further indicated in FIG. 1, a rotor 180 (e.g., a metallic or magnetic element that is affixed to the object for which an angular position, an applied torque, or the like, is to be determined) may be arranged relative to the TX coil 152 and the sets of RX coils 154. In some implementations, the rotor 180 is arranged to move (e.g., rotate about an axis) relative to the TX coil 152 and the sets of RX coils 154 such that inductive coupling between the TX coil 152 and the sets of RX coils 154 depends on a position (e.g., an angular position) of the rotor 180. In some implementations, the inductive sensor 100 may include a single rotor 180. In some implementations, the inductive sensor 100 may include multiple rotors 180 (e.g., a rotor 180 for each angle measurement path 102, an example of which is shown in FIG. 2).

An angle measurement path 102 (e.g., the angle measurement path 102a, the angle measurement path 102b) includes one or more components associated with determining an angular position of the rotor 180 based on a set of input signals associated with a set of RX coils 154. For example, the set of input signals may include a signal indicating a sine of the angular position (herein referred to as a sine signal) and a signal indicating a cosine of the angular position (herein referred to a cosine signal). That is, the set of input signals may include a pair of signals with a 90 degree)(° phase offset. Here, the angle measurement path 102 may determine an angular position of the rotor 180 based on the sine signal and the cosine signal (e.g., by calculating an arctangent of the sine signal divided by the cosine signal).

In some implementations, as shown in FIG. 1, the inductive sensor 100 includes two angle measurement paths 102, each of which processes a different set of input signals. For example, the angle measurement path 102a may receive a first set of input signals associated with the set of RX coils 154a and may determine an angular position of the rotor 180 based on the first set of input signals. Similarly, the angle measurement path 102b may receive a second set of input signals received associated with the set of RX coils 154b and may determine an angular position of the rotor 180 based on the second set of input signals. In some implementations, the angle measurement path 102a, the angle measurement path 102b, and/or another component of the inductive sensor 100 may include a component configured to calculate a torque based on the angular position determined on the angle measurement path 102a and the angular position determined on the angle measurement path 102b (e.g., by calculating a difference between the angular position determined on the angle measurement path 102a and the angular position determined on the angle measurement path 102b).

The amplitude regulation path 104 includes one or more components associated with regulating an amplitude of a set of output signals transmitted by the TX coil excitation component 106 (e.g., to the TX coil 152). For example, the amplitude regulation path 104 may receive the first set of input signals associated with the set of RX coils 154a and may receive the set of output signals associated with the TX coil excitation component 106 (i.e., output signals actually transmitted by the TX coil excitation component 106). Here, the amplitude regulation path 104 may determine a target output signal amplitude based on the first set of input signals and amplitudes of the set of output signals. The amplitude regulation path 104 may then provide, to the TX coil excitation component 106, a signal indicating the target output signal amplitude and, in this way, may regulate the amplitude of the set of output signals transmitted by the TX coil excitation component 106.

The TX coil excitation component 106 includes one or more components associated with transmitting the set of output signals to the TX coil 152. For example, the TX coil excitation component 106 may include a coil oscillator that receives, from the amplitude regulation path 104, a signal indicating a target output signal amplitude, and may transmit a set of output signals based on the target output signal amplitude (e.g., such that the output signals have an amplitude that matches the target output signal amplitude).

The safety path 108 includes one or more components associated with performing one or more safety checks associated with the inductive sensor 100. In some implementations, each safety check of the one or more safety checks is associated with at least one of the angle measurement path 102a, the angle measurement path 102b, or the amplitude regulation path 104. In some implementations, as shown in FIG. 1, the safety path 108 may be configured to receive the set of output signals transmitted by the TX coil excitation component 106, the second set of input signals associated with set of RX coils 154b, and/or one or more other signals in association with performing the one or more safety checks, as described herein. In some implementations, as shown in FIG. 1, the safety path 108 may be configured to provide a safety indication (e.g., a failure indication, an error indication, a deactivation indication, an OK indication, or the like) to the digital output signal generation component 110. Details regarding examples of the one or more safety checks that can be performed by the safety path 108 are provided following the description of FIG. 2.

The digital output signal generation component 110 includes one or more components associated with generating and transmitting an output signal (e.g., a signal carrying sensor data, a signal carrying a safety indication, or the like). In some implementations, as shown in FIG. 1, the digital output signal generation component 110 may receive one or more signals from the angle measurement path 102a, the angle measurement path 102b, and the safety path 108, and may generate and transmit the output signal accordingly. In some implementations, the digital output signal generation component 110 may transmit the output signal to an electronic control unit (ECU) (not shown) associated with the inductive sensor 100.

As indicated above, FIG. 1 is provided as an example. Other examples may differ from what is described with regard to FIG. 1. Further, the number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Additionally, or alternatively, a set of components (e.g., one or more components) shown in FIG. 1 may perform one or more functions described as being performed by another set of components shown in FIG. 1.

FIG. 2 is a block diagram illustrating a particular example implementation 200 of the inductive sensor 100 described above.

As shown in FIG. 2, in the example implementation 200, the angle measurement path 102a includes a demodulator 202, an analog-to-digital convertor (ADC) 204, a digital input state machine 206, and an angle calculation component 208. In some implementations, although not indicated in FIG. 2, the angle measurement path 102a may further include a torque calculation component 218 or a memory 220 (e.g., a non-volatile memory component). In operation, the demodulator 202 receives a first input signal from a first RX coil 154a (e.g., via a coil input Ia0 and a coil input Ia1), and receives a second input signal from a second RX coil 154a (e.g., via a coil input Ia2 and a coil input Ia3). Here, the first input signal is a signal indicating a cosine of an angular position of the rotor 180a, while the second input signal corresponds is a signal indicating a sine of the angular position of the rotor 180a. The first and second input signals on the angle measurement path 102a are referred to collectively as a first set of input signals. The demodulator 202, the ADC 204, and the digital input state machine 206 process the first set of input signals to generate a signal indicating a cosine x1 of the angular position of the rotor 180a and a signal indicating a sine y1 of the angular position of the rotor 180a, which are provided to the angle calculation component 208. The angle calculation component 208 calculates an angular position a1 of the rotor 180a based on the cosine x1 and the sine y1 (e.g., using information from the memory 220). The angle calculation component 208 then provides the angular position a1 to the torque calculation component 218. In some implementations, as shown, the digital input state machine 206 may provide signals indicating the cosine x1 and the sine y1 as determined on the angle measurement path 102a to the safety path 108 (e.g., to a safety digital signal processor (DSP) 242). In some implementations, the angle calculation component 208 may provide a signal indicating the angular position a1 to the safety path 108 (e.g., to the safety DSP 242). In some implementations, the angle calculation component 208 may provide a signal indicating angular position a1 to the digital output signal generation component 110 (e.g., a digital protocol generation component 222) which may generate and provide (e.g., via an analog protocol output stage 224) an output signal carrying an indication of the angular position a1.

As further shown in the example implementation 200, the angle measurement path 102b includes a demodulator 210, an ADC 212, a digital input state machine 214, and an angle calculation component 216. In some implementations, although not indicated in FIG. 2, the angle measurement path 102b may further include the torque calculation component 218 or the memory 220. In operation, the demodulator 210 receives a first input signal from a first RX coil 154b (e.g., via a coil input MO and a coil input Ib1), and receives a second input signal from a second RX coil 154b (e.g., via a coil input Ib2 and a coil input Ib3). Here, the first input signal is a signal indicating a cosine of an angular position of the rotor 180b, while the second input signal is a signal indicating a sine of the angular position of the rotor 180b. The first and second input signals on the angle measurement path 102b are referred to collectively as a second set of input signals. The demodulator 210, the ADC 212, and the digital input state machine 214 process the second set of input signals to generate a signal indicating a cosine x2 of the angular position of the rotor 180b and a signal indicating a sine y2 of the angular position of the rotor 180b, which are provided to the angle calculation component 216. The angle calculation component 216 calculates an angular position a2 of the rotor 180b based on the cosine x2 and the sine y2 (e.g., and using information from the memory 220). The angle calculation component 216 then provides a signal indicating the angular position a2 to the torque calculation component 218 and to the safety path 108 (e.g., to the safety DSP 242). In some implementations, as shown, the digital input state machine 214 may provide signals indicating the cosine x2 and the sine y2 as determined on the angle measurement path 102b to the safety path 108 (e.g., to the safety DSP 242). In some implementations, the angle calculation component 216 may provide the angular position a1 to the safety path 108 (e.g., to the safety DSP 242). In some implementations, the angle calculation component 216 may provide a signal indicating the angular position a2 to the digital output signal generation component 110 (e.g., the digital protocol generation component 222) which may generate and provide (e.g., via the analog protocol output stage 224) an output signal carrying an indication of the angular position a2.

In some implementations, the torque calculation component 218 (e.g., included on the angle measurement path 102a or the angle measurement path 102b) may determine a torque T based on the angular position a1 from the angle measurement path 102a and the angular position a2 from the angle measurement path 102b. In some implementations, the torque calculation component 218 may provide a signal indicating the torque T to the safety path 108 (e.g., to the safety DSP 242). In some implementations, the torque calculation component 218 may provide a signal indicating the torque T to the digital output signal generation component 110 (e.g., the digital protocol generation component 222) which may generate and provide (e.g., via the analog protocol output stage 224) an output signal carrying an indication of the torque T.

As further shown in the example implementation 200, the amplitude regulation path 104 includes a demultiplexer 226, an ADC 228, a digital input state machine 230, and a digital amplitude generation component 232. In operation, the demultiplexer 226 receives a set of output signals (e.g., signals provided to a coil output O1 and a coil output O2 by the TX coil excitation component 106, such as a coil oscillator component 234). The demultiplexer 226, the ADC 228, and the digital input state machine 230 process the set of output signals to determine a target output signal amplitude amp1, and a signal indicating the target output signal amplitude amp1 is provided to the digital amplitude generation component 232. The digital amplitude generation component 232 then provides, to the coil oscillator component 234, a signal associated with regulating the amplitudes of the set of output signals (e.g., such that the set of output signals have an amplitude that matches the target signal amplitude amp1). In some implementations, as shown, the digital input state machine 230 provides a signal indicating the target output signal amplitude amp1 to the safety path 108 (e.g., to the safety DSP 242).

In some implementations, as further shown, the demultiplexer 226 receives the first set of input signals associated with the set of RX coils 154a. Here, the demultiplexer 226, the ADC 228, and the digital input state machine 230 process the first set of input signals and provide signals indicating a cosine X1S and a sine Y1S to the safety path 108 (e.g., to the safety DSP 242). Here, the signal indicating the cosine X1S corresponds to a cosine signal of the angular position of the rotor 180a on the amplitude regulation path 104 (e.g., the cosine signal of the angular position after the first set of input signals is processed by the amplitude regulation path 104), and the signal indicating the sine Y1S corresponds to a sine signal of the angular position of the rotor 180a on the amplitude regulation path 104 (e.g., the sine signal of the angular position after the first set of input signals is processed by the amplitude regulation path 104). In some implementations, the signals indicating the cosine X1S and the sine Y1S are used by the safety path 108 in association with performing one or more safety checks, as described below. Thus, by providing the signals indicating the cosine X1S and the sine Y1S in association with performing the one or more safety checks, the amplitude regulation path 104 may serve partially as a safety path associated with performing the one or more safety checks.

As further shown in the example implementation 200, the safety path 108 includes a demultiplexer 236, an ADC 238, a digital input state machine 240, the safety DSP 242, and a memory 244 (e.g., a read-only memory (ROM)). In operation, the demultiplexer 236 receives the second set of input signals associated with the set of RX coils 154b and receives the set of output signals (e.g., signals provided to the coil output O1 and the coil output O2 by the TX coil excitation component 106). The demultiplexer 236, the ADC 238, and the digital input state machine 240 process the set of output signals to determine a target output signal amplitude amp2 (e.g., in a manner similar to that of the amplitude regulation path 104), and a signal indicating the target output signal amplitude amp2 is provided to the safety DSP 242. In some implementations, the safety path 108 uses the target output signal amplitude amp2 to perform one or more safety checks, as described below.

In some implementations, as shown, the digital input state machine 240 provides signals indicating a cosine X2S and a sine Y2S to the safety path 108 (e.g., to the safety DSP 242). Here, the signal indicating the cosine X2S corresponds to a cosine signal of the angular position of the rotor 180b on the safety path 108 (e.g., the cosine signal of the angular position after the second set of input signals is processed by the safety path 108) and the signal indicating the sine Y2S corresponds to a sine signal of the angular position of the rotor 180b on the safety path 108 (e.g., the sine signal of the angular position after the second set of input signals is processed by the safety path 108). In some implementations, the safety path 108 uses the signals indicating the cosine X2S and the sine Y2S to perform one or more safety checks, as described below.

In some implementations, the safety path 108 may perform one or more safety checks associated with the angle measurement path 102a, the angle measurement path 102b, the amplitude regulation path 104, or the TX coil excitation component 106. For example, the safety DSP 242 (e.g., using information from the memory 244) may perform a safety check based on the cosine x1, the sine y1, the angular position a1, the cosine x2, the sine y2, the angular position a2, the torque T, the target output signal amplitude amp1, the cosine X1S, the sine Y1S, the target output signal amplitude amp1, the cosine X2S, the sine Y2S, the target output signal amplitude amp2, or the like. Examples of safety checks that can be performed by the safety DSP 242 are provided below. In some implementations, the safety DSP 242 may provide a safety indication (e.g., a failure indication, an error indication, a deactivation indication, an OK indication, or the like) associated with one or more safety checks performed by the safety path 108 to the digital output signal generation component 110 (e.g., the digital protocol generation component 222) which may generate and provide (e.g., via the analog protocol output stage 224) an output signal carrying the safety indication.

As indicated above, FIG. 2 is provided as an example. Other examples may differ from what is described with regard to FIG. 2. Further, the number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more functions described as being performed by another set of components shown in FIG. 2.

As described above, the safety path 108 may perform one or more safety checks associated with the angle measurement path 102a, the angle measurement path 102b, the amplitude regulation path 104, the TX coil excitation component 106, or the like. Examples of safety checks that can be performed by the safety path 108 are provided as follows.

In some aspects, the one or more safety checks performed by the safety path 108 may include a determination of whether a difference between the angular position determined on the angle measurement path 102a and the angular position determined on the angle measurement path 102b satisfies a threshold. For example, the safety path 108 (e.g., the safety DSP 242) may receive, from the angle measurement path 102a, the signal indicating the angular position a1 as determined by the angle measurement path 102a. The safety path 108 may further receive, from the angle measurement path 102b, the signal indicating the angular position a2 as determined by the angle measurement path 102b. Here, the safety path 108 may calculate a difference between the angular position a1 and the angular position a2, and may determine whether the difference satisfies an angular position difference threshold (e.g., is less than or equal a maximum allowable difference, such as 2°, 5°, or the like). In this example, if the difference satisfies the threshold, then the safety path 108 may determine that the angular positions a1 and a2 pass the safety check. Conversely, if the difference fails to satisfy the threshold, then the safety path 108 may determine that the angular positions a1 and a2 fail the safety check.

In some implementations, the one or more safety checks performed by the safety path 108 may include a determination of whether an amplitude of an output signal transmitted by the TX coil excitation component 106 matches a target output signal amplitude determined on the amplitude regulation path 104. For example, the safety path 108 may receive an output signal provided to the coil output O1 by the TX coil excitation component 106 and may receive the signal indicating target output signal amplitude amp1 determined on the amplitude regulation path 104. Here, the safety path 108 may calculate a difference between an amplitude of the output signal provided to the coil output O1 and the target output signal amplitude amp1 determined on the amplitude regulation path 104, and may determine whether the difference satisfies an amplitude difference threshold (e.g., is less than or equal a maximum allowable difference). In this example, if the difference satisfies the threshold, then the safety path 108 may determine that the amplitude of the output signal provided to the coil output O1 passes the safety check. Conversely, if the difference fails to satisfy the threshold, then the safety path 108 may determine that the output signal provided to the coil output O1 fails the safety check. In some implementations, the safety path 108 may (separately) perform this safety check for each output signal provided to a coil output by the TX coil excitation component 106 (e.g., the safety path 108 may perform a similar check for an output signal provided to the coil output O2 by the TX coil excitation component 106).

In some implementations, the one or more safety checks performed by the safety path 108 may include a determination of whether a target output signal amplitude determined on the amplitude regulation path 104 matches a target output signal amplitude determined on the safety path 108. For example, the safety path 108 may receive the signal indicating the target output signal amplitude amp1 determined on the amplitude regulation path 104. The safety path 108 may also receive the set of output signals provided to the coil outputs O1 and O2, as described above. Here, the safety path 108 (e.g., the digital input state machine 240) may determine a target output signal amplitude amp2, based on the set of output signals. The safety path 108 (e.g., the safety DSP 242) may then calculate a difference between the target output signal amplitude amp1 determined on the amplitude regulation path 104 and the target output signal amp2 determined on the safety path 108. The safety path 108 may then determine whether the difference satisfies a target output signal amplitude difference threshold (e.g., is less than or equal a maximum allowable difference). In this example, if the difference satisfies the threshold, then the safety path 108 may determine that the target output signal amplitude amp1 determined on the amplitude regulation path 104 passes the safety check. Conversely, if the difference fails to satisfy the threshold, then the safety path 108 may determine that the target output signal amplitude amp1 determined on the amplitude regulation path 104 fails the safety check.

In some implementations, the one or more safety checks performed by the safety path 108 may include a determination of whether a vector length of amplitudes associated with the first set of input signals is within a particular vector length range on the amplitude regulation path 104. For example, the safety path 108 may receive the signals indicating the cosine X1S and the sine Y1S from the amplitude regulation path 104. Here, the safety path 108 may calculate a vector length raS of amplitudes of the signal indicating the cosine X1S and the signal indicating the sine Y1S (e.g., raS=sqrt (X1S$^2$+Y1S$^2$)). Next, the safety path 108 may determine whether the vector length raS is within a particular vector length range (e.g., whether raS$_{min}$≤raS≤raS$_{max}$). In this example, if the vector length raS is within the particular vector length range, then the safety path 108 may determine that the vector length raS of the amplitudes associated with the first set of input signals on the amplitude regulation path 104 passes the safety check. Conversely, if the vector length raS is outside of the particular vector length range, then the safety path 108 may determine that the vector length raS of the amplitudes associated with the first set of input signals on the amplitude regulation path 104 fails the safety check. Notably, the vector length raS is not impacted by processing on the angle measurement path 102*a* (e.g., because the signals indicating the cosine X1S and the sine Y1S are provided by the amplitude regulation path 104). Thus, this safety check provides a vector length check associated with the first set of input signals that is independent of the angle measurement path 102*a*.

In some implementations, the one or more safety checks performed by the safety path 108 may include a determination of whether a vector length of amplitudes associated with the second set of input signals is within a particular vector length range on the safety path 108. For example, the safety path 108 may process the second set of input signals to generate the signals indicating the cosine X2S and the sine Y2S. Here, the safety path 108 may calculate a vector length rbS of amplitudes of the signal indicating cosine X2S and the signal indicating the sine Y2S (e.g., rbS=sqrt (X2S$^2$+Y2S$^2$)). Next, the safety path 108 may determine whether the vector length rbS is within a particular vector length range (e.g., whether rbS$_{min}$≤rbS≤rbS$_{max}$). In this example, if the vector length rbS is within the particular vector length range, then the safety path 108 may determine that the vector length rbS of the amplitudes associated with the second set of input signals passes the safety check. Conversely, if the vector length rbS is outside of the particular vector length range, then the safety path 108 may determine that the vector length rbS of the amplitudes associated with the second set of input signals fails the safety check. Notably, the vector length rbS is not impacted by processing on the angle measurement path 102*b* (e.g., because the signals indicating the cosine X2S and the sine Y2S are generated by the amplitude regulation path 104). Thus, this safety check provides a vector length check associated with the second set of input signals that is independent of the angle measurement path 102*b*.

In some implementations, the one or more safety checks include a determination of whether an amplitude associated with a subset of the first set of input signals on the angle measurement path 102*a* matches an amplitude associated with a corresponding subset of the second set of input signals on the angle measurement path 102*b*. For example, the safety path 108 may receive the signal indicating the cosine x1 from the angle measurement path 102*a*. The safety path 108 may further receive the signal indicating the cosine signal x2 from the angle measurement path 102*b*. Here, the safety path 108 may determine a difference between an amplitude of the signal indicating the cosine signal x1 from the angle measurement path 102*a* and an amplitude of the signal indicating the cosine signal x2 from the angle measurement path 102b, and may determine whether the difference satisfies a signal amplitude difference threshold (e.g., is less than or equal a maximum allowable difference). In this example, if the difference satisfies the threshold, then the safety path 108 may determine that amplitudes of the signals indicating the cosine signals x1 and x2 pass the safety check. Conversely, if the difference fails to satisfy the threshold, then the safety path 108 may determine that the amplitudes of the signal indicating the cosine signals x1 and x2 fail the safety check. In some implementations, the safety path 108 may perform a similar safety check for the signal indicating the sine y1 from the angle measurement path 102a and the signal indicating the sine y2 from the angle measurement path 102b.

In some implementations, the one or more safety checks include a determination of whether a torque T calculated on an angle measurement path matches a torque calculated on the safety path 108. For example, the safety path 108 may receive (e.g., from the angle measurement path 102a, the angle measurement path 102b, or the like) a signal indicating a torque T calculated the angle measurement path 102. Further, the safety path 108 may receive the signal indicating the angular position a1 determined on the angle measurement path 102a and may receive the signal indicating the angular position a2 determined on the angle measurement path 102b. Here, the safety path 108 may calculate a torque based on the angular position a1 determined on the angle measurement path 102a and the angular position a2 determined on the angle measurement path 102b. The safety path 108 may then determine whether a difference between the torque T calculated on the angle measurement path 102 and the torque calculated on the safety path 108 satisfies a torque difference threshold (e.g., is less than or equal a maximum allowable difference). In this example, if the difference satisfies the threshold, then the safety path 108 may determine that the torque T from the angle measurement path 102 passes the safety check. Conversely, if the difference fails to satisfy the threshold, then the safety path 108 may determine that the torque T from the angle measurement path 102 fails the safety check.

In some implementations, the one or more safety checks include a determination of whether a resistance at a connection of the inductive sensor 100 to an external coil (e.g., an RX coil 154, the TX coil 152) satisfies a resistance threshold. For example, the safety path 108 may receive a signal indicating a resistance at a connection of the inductive sensor 100 to the external coil, and may determine whether the resistance satisfies a resistance threshold (e.g., is less than or equal to a maximum allowable resistance). In this example, if the resistance at the connection satisfies the threshold, then the safety path 108 may determine that the resistance at the connection passes the safety check. Conversely, if the resistance at the connection fails to satisfy the threshold, then the safety path 108 may determine that the resistance at the connection fails the safety check.

In some implementations, the one or more safety checks include a determination of whether a vector length of amplitudes associated with the first set of input signals is within a particular vector length range on the angle measurement path 102a. For example, the safety path 108 may receive the signal indicating the cosine x1 and the signal indicating the sine y1. Here, the safety path 108 may calculate a vector length ra of the amplitudes of the signal indicating the cosine x1 and the signal indicating the sine y1 (e.g., ra=sqrt $(x1^2+y1^2)$). Next, the safety path 108 may determine whether the vector length ra is within a particular vector length range (e.g., whether $ra_{min} \leq ra \leq ra_{max}$). In this example, if the vector length ra is within the particular vector length range, then the safety path 108 may determine that the vector length ra of the amplitudes associated with the first set of input signals from the angle measurement path 102a passes the safety check. Conversely, if the vector length ra is outside of the particular vector length range, then the safety path 108 may determine that the vector length ra of the amplitudes associated with the first set of input signals from the angle measurement path 102a fails the safety check.

In some implementations, the one or more safety checks include a determination of whether a vector length of amplitudes associated with the second set of input signals is within a particular vector length range on the angle measurement path 102b. For example, the safety path 108 may receive the signal indicating the cosine x2 and the signal indicating the sine y2. Here, the safety path 108 may calculate a vector length rb of the amplitudes of the signal indicating the cosine x2 and the signal indicating the sine y2 from the angle measurement path 102b (e.g., rb=sqrt $(x2^2+y2^2)$). Next, the safety path 108 may determine whether the vector length rb is within a particular vector length range (e.g., whether $rb_{min} \leq rb \leq rb_{max}$). In this example, if the vector length rb is within the particular vector length range, then the safety path 108 may determine that the vector rb length of the amplitudes associated with the second set of input signals from the angle measurement path 102b passes the safety check. Conversely, if the vector length rb is outside of the particular vector length range, then the safety path 108 may determine that the vector length rb of the amplitudes associated with the second set of input signals from the angle measurement path 102b fails the safety check.

In some implementations, the one or more safety checks include a determination of whether a characteristic of a first coil input associated with a first input signal matches a characteristic of a second coil input associated with a second input signal, where the first input signal is included in the first set of input signals and the second input signal is included in the second set of input signals. For example, the safety path 108 may receive a signal corresponding a first coil input Ia0 (e.g., a coil input at a particular terminal of an RX coil 154a), and may receive a signal corresponding to a second coil input Ib0 (e.g., a coil input at a particular terminal of an RX coil 154b). Here, the safety path 108 may determine whether a difference between a characteristic (e.g., an amplitude) of the signal corresponding to the coil input Ia0 matches a characteristic of the signal corresponding to the coil input Ib0 satisfies a coil input characteristic difference threshold (e.g., is less than or equal a maximum allowable difference). In this example, if the difference satisfies the threshold, then the safety path 108 may determine that the characteristic of the coil inputs Ia0 and Ib0 pass the safety check. Conversely, if the difference fails to satisfy the threshold, then the safety path 108 may determine that the characteristic of the coil inputs Ia0 and Ib0 fail the safety check. In some implementations, the safety path 108 may perform a similar safety check for other pairs of coil inputs at the RX coils 154 (e.g., coil inputs Ia1 and Ib1, coil inputs Ia2 and Ib2, coil inputs Ia3 and Ib3, or the like).

The above described safety checks are provided as examples, and other safety checks are possible (e.g., depending on the design of the inductive sensor 100). That is, in some implementations of the inductive sensor 100, the safety path 108 may perform one or more additional, other, or different safety checks than those described above.

Notably, in inductive sensor 100 in FIG. 1 (e.g., and in the example implementation 200 of the inductive sensor 100), the angle measurement path 102a, the angle measurement path 102b, the amplitude regulation path 104, and the safety path 108 are illustrated as being implemented in independent hardware. That is, components of the inductive sensor 100 that perform measurement (e.g., angle measurement, output signal amplitude measurement, or the like), control (e.g., output signal amplitude regulation), and safety checking are illustrated as being implemented in independent hardware. However, in some implementations, one or more components of one or more paths of the inductive sensor 100 may be implemented in software or may be implemented in a combination of hardware and software. For example, portions of two or more paths of the inductive sensor 100 may in some implementations be combined on common (e.g., shared) hardware (e.g., a lockstep core). In some implementations, functions of the portions of the two or more paths combined on the common hardware may be diverse (e.g., to improve safety of using the common hardware).

Figure 3:
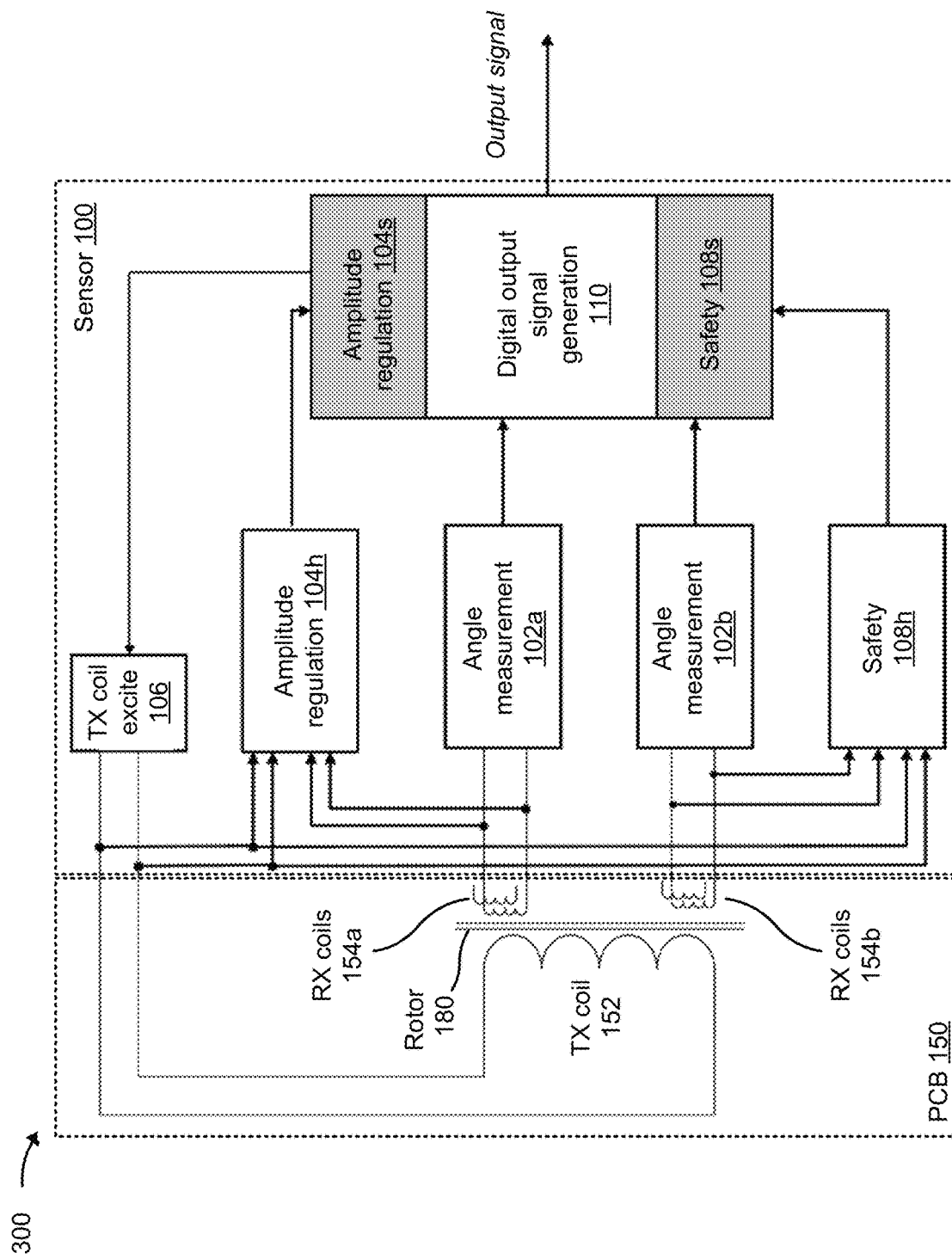
FIG. 3 is a block diagram illustrating another example inductive sensor with improved safety, as described herein.

FIG. 3 is a block diagram illustrating an example implementation 300 of an inductive sensor 100 in which components to perform measurement are implemented in hardware, while components configured to perform control and components configured to perform safety checking are implemented in software. In the example shown in FIG. 3, the angle measurement path 102a and the angle measurement path 102b are implemented in independent hardware. However, the amplitude regulation path 104 is implemented in a combination of hardware and software. For example, a portion 104h of the amplitude regulation path 104 associated with performing a measurement (e.g., a measurement of an amplitude of an output signal provided by the TX coil excitation component 106) is implemented in independent hardware, while a portion 104s of the amplitude regulation path 104 associated with performing control and/or safety checking is implemented in an independent software task. Similarly, a portion 108h of the safety path 108 associated with performing a measurement is implemented in independent hardware, while a portion 108s of the safety path 108 associated with performing safety checking is implemented in one or more independent software tasks. In some implementations, the example implementation 300 may utilized independent software tasks (e.g., to ensure safety for the example implementation 300).

As indicated above, FIG. 3 is provided as an example. Other examples may differ from what is described with regard to FIG. 3. Further, the number and arrangement of components shown in FIG. 3 are provided as an example. In practice, there may be additional components, fewer components, different components, or differently arranged components than those shown in FIG. 3. Furthermore, two or more components shown in FIG. 3 may be implemented within a single component, or a single component shown in FIG. 3 may be implemented as multiple, distributed components. Additionally, or alternatively, a set of components (e.g., one or more components) shown in FIG. 3 may perform one or more functions described as being performed by another set of components shown in FIG. 3.

Figure 4:
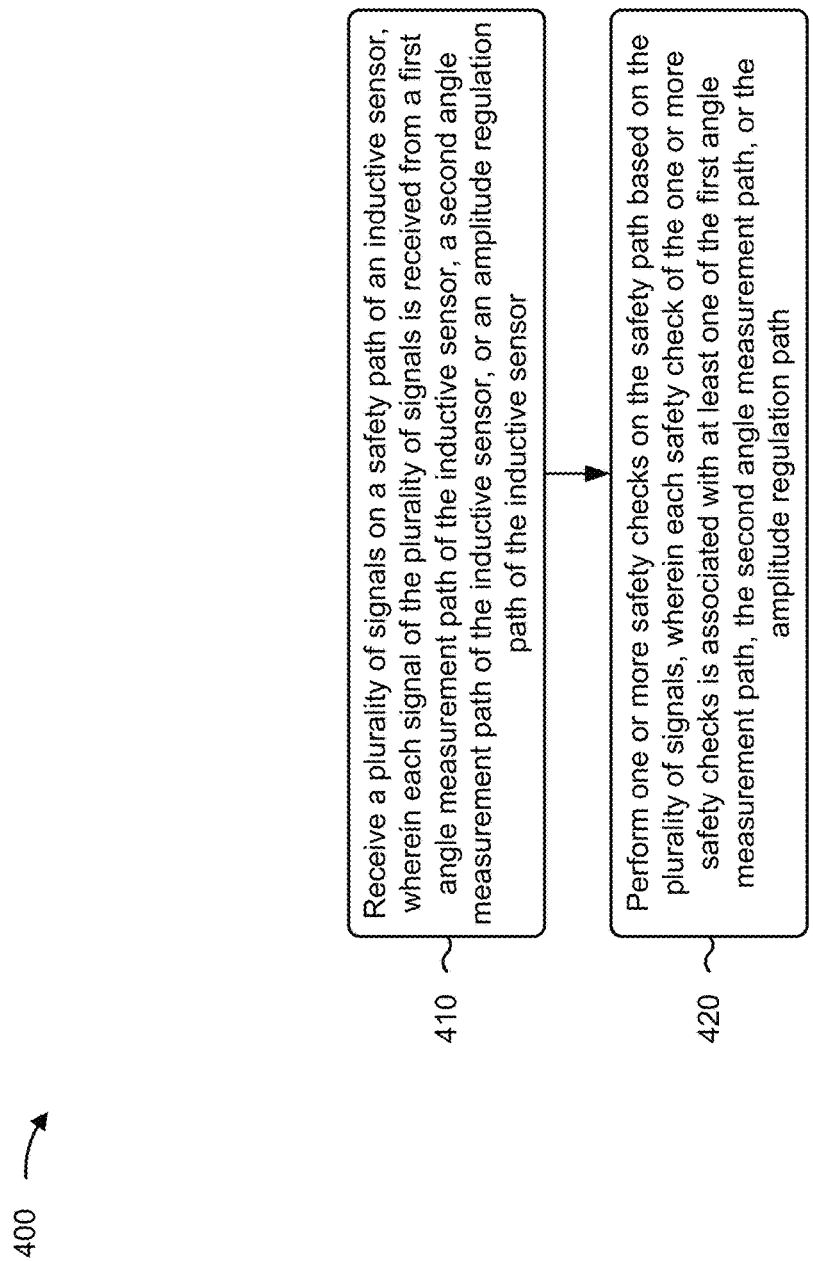
FIG. 4 is a flowchart of an example process relating to an inductive sensor performing one or more safety checks, as described herein.

FIG. 4 is a flowchart of an example process relating to an inductive sensor performing one or more safety checks, as described herein. In some implementations, one or more process blocks of FIG. 4 may be performed by an inductive sensor (e.g., inductive sensor 100).

As shown in FIG. 4, process 400 may include receiving a plurality of signals on a safety path of an inductive sensor, wherein each signal of the plurality of signals is received from a first angle measurement path of the inductive sensor, a second angle measurement path of the inductive sensor, or an amplitude regulation path of the inductive sensor (block 410). For example, the inductive sensor may receive a plurality of signals on a safety path (e.g., safety path 108) of the inductive sensor, wherein each signal of the plurality of signals is received from a first angle measurement path (e.g., angle measurement path 102a) of the inductive sensor, a second angle measurement path (e.g., angle measurement path 102b) of the inductive sensor, or an amplitude regulation path (e.g., amplitude regulation path 104) of the inductive sensor, as described above.

As further shown in FIG. 4, process 400 may include performing one or more safety checks on the safety path based on the plurality of signals, wherein each safety check of the one or more safety checks is associated with at least one of the first angle measurement path, the second angle measurement path, or the amplitude regulation path (block 420). For example, the inductive sensor may perform one or more safety checks on the safety path based on the plurality of signals, wherein each safety check of the one or more safety checks is associated with at least one of the first angle measurement path, the second angle measurement path, or the amplitude regulation path, as described above.

Process 400 may include additional implementations, such as any single implementation or any combination of implementations described below and/or in connection with one or more other processes described elsewhere herein.

In a first implementation, the first angle measurement path, the second angle measurement path, the amplitude regulation path, and the safety path are integrated on a monolithic semiconductor device.

In a second implementation, alone or in combination with the first implementation, the amplitude regulation path includes a partial safety path associated with performing a safety check associated with the first set of input signals.

In a third implementation, alone or in combination with one or more of the first and second implementations, the plurality of signals includes a first signal indicating an angular position determined on the first angle measurement path and a second signal indicating an angular position determined on the second angle measurement path, and performing the one or more safety checks comprises determining whether a difference between the angular position determined on the first angle measurement path and the angular position determined on the second angle measurement path satisfies a threshold.

In a fourth implementation, alone or in combination with one or more of the first through third implementations, the plurality of signals includes a first signal indicating an amplitude of an output signal and a second signal indicating a target output signal amplitude determined on the amplitude regulation path, and performing the one or more safety checks comprises determining whether the amplitude of the output signal matches the target output signal amplitude.

In a fifth implementation, alone or in combination with one or more of the first through fourth implementations, the plurality of signals includes a first signal indicating a target output signal amplitude determined on the amplitude regulation path and a second signal indicating a target output signal amplitude determined on the safety path, and performing the one or more safety checks comprises determining whether the target output signal amplitude determined on the amplitude regulation path matches the target output signal amplitude determined on the safety path.

In a sixth implementation, alone or in combination with one or more of the first through fifth implementations, wherein the plurality of signals includes a set of input signals, and performing the one or more safety checks comprises determining whether a vector length of amplitudes associated with the set of input signals is within a particular vector length range on the amplitude regulation path.

In a seventh implementation, alone or in combination with one or more of the first through sixth implementations, wherein the plurality of signals includes a first set of input signals and a second set of input signals, and performing the one or more safety checks includes determining whether an amplitude associated with a subset of the first set of input signals on the first angle measurement path matches an amplitude associated with a corresponding subset of the second set of input signals on the second angle measurement path.

In an eighth implementation, alone or in combination with one or more of the first through seventh implementations, wherein the plurality of signals includes a signal indicating a torque calculated on an angle measurement path measurement path matches a torque calculated on the safety path, and performing the one or more safety checks includes determining whether the torque calculated on the angle measurement path matches the torque calculated on the safety path.

In a ninth implementation, alone or in combination with one or more of the first through eighth implementations, wherein the plurality of signals includes a signal indicating a resistance at a connection of the inductive sensor to an external coil, and performing the one or more safety checks comprises determining whether the resistance at the connection of the inductive sensor to the external coil satisfies a resistance threshold.

In a tenth implementation, alone or in combination with one or more of the first through ninth implementations, wherein the plurality of signals includes a set of input signals associated with a set of input signals, and performing the one or more safety checks comprises determining whether a vector length of amplitudes associated with the set of input signals is within a particular vector length range on a corresponding angle measurement path.

In an eleventh implementation, alone or in combination with one or more of the first through tenth implementations, wherein the plurality of signals includes a first input signal and a second input signal, and performing the one or more safety checks comprises determining whether a characteristic a first coil input associated with a first input signal matches a characteristic of a second coil input associated with a second input signal, wherein the first input signal is included in the first set of input signals and the second input signal is included in the second set of input signals.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software. It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An inductive sensor, comprising:
   a first angle measurement path associated with determining an angular position based on a first set of input signals;
   a second angle measurement path associated with determining an angular position based on a second set of input signals;
   an amplitude regulation path associated with regulating amplitudes of a set of output signals; and
   a safety path associated with performing one or more safety checks, wherein each safety check of the one or more safety checks is associated with at least one of the first angle measurement path, the second angle measurement path, or the amplitude regulation path.

2. The inductive sensor of claim 1, wherein the first angle measurement path, the second angle measurement path, the amplitude regulation path, and the safety path are integrated on a monolithic semiconductor device.

3. The inductive sensor of claim 1, wherein the amplitude regulation path includes a partial safety path associated with performing a safety check, of the one or more safety checks, associated with the first set of input signals.

4. The inductive sensor of claim 1, wherein the one or more safety checks includes a determination of whether a difference between the angular position determined on the first angle measurement path and the angular position determined on the second angle measurement path satisfies a threshold.

5. The inductive sensor of claim 1, wherein the one or more safety checks includes a determination of whether an amplitude of an output signal, of the set of output signals, matches a target output signal amplitude determined on the amplitude regulation path.

6. The inductive sensor of claim 1, wherein the one or more safety checks includes a determination of whether a target output signal amplitude determined on the amplitude regulation path matches a target output signal amplitude determined on the safety path.

7. The inductive sensor of claim 1, wherein the one or more safety checks includes a determination of whether a vector length of amplitudes associated with the first set of input signals is within a particular vector length range on the amplitude regulation path.

8. The inductive sensor of claim 1, wherein the one or more safety checks includes a determination of whether a vector length of amplitudes associated with the second set of input signals is within a particular vector length range on the safety path.

9. The inductive sensor of claim 1, wherein the one or more safety checks includes a determination of whether an amplitude associated with a subset of the first set of input signals on the first angle measurement path matches an amplitude associated with a corresponding subset of the second set of input signals on the second angle measurement path.

10. The inductive sensor of claim 1, wherein the one or more safety checks includes a determination of whether a torque based on an angle measurement path matches a torque based on the safety path.

11. The inductive sensor of claim 1, wherein the one or more safety checks includes a determination of whether a resistance at a connection of the inductive sensor to an external coil satisfies a resistance threshold.

12. The inductive sensor of claim 1, wherein the one or more safety checks includes a determination of whether a vector length of amplitudes associated with the first set of input signals is within a particular vector length range on the first angle measurement path.

13. The inductive sensor of claim 1, wherein the one or more safety checks includes a determination of whether a vector length of amplitudes associated with the second set of input signals is within a particular vector length range on the second angle measurement path.

14. The inductive sensor of claim 1, wherein the one or more safety checks includes a determination of whether a characteristic of a first coil input associated with a first input signal matches a characteristic of a second coil input associated with a second input signal, wherein the first input signal is included in the first set of input signals and the second input signal is included in the second set of input signals.

15. A method, comprising:
receiving a plurality of signals on a safety path of an inductive sensor, wherein the plurality of signal comprises:
a first signal received from a first angle measurement path of the inductive sensor or a second angle measurement path of the inductive sensor, and
a second signal received from an amplitude regulation path of the inductive sensor; and
performing one or more safety checks on the safety path based on the plurality of signals, wherein each safety check of the one or more safety checks is associated with at least one of the first angle measurement path, the second angle measurement path, or the amplitude regulation path.

16. The method of claim 15, wherein the first angle measurement path, the second angle measurement path, the amplitude regulation path, and the safety path are integrated on a monolithic semiconductor device.

17. The method of claim 15, wherein the plurality of signals includes a first signal indicating an angular position determined on the first angle measurement path and a second signal indicating an angular position determined on the second angle measurement path, and
wherein performing the one or more safety checks comprises:
determining whether a difference between the angular position determined on the first angle measurement path and the angular position determined on the second angle measurement path satisfies a threshold.

18. The method of claim 15, wherein the plurality of signals includes a third signal indicating an amplitude of an output signal, and fourth signal indicating a target output signal amplitude determined on the amplitude regulation path, and
wherein performing the one or more safety checks comprises:
determining whether the amplitude of the output signal matches the target output signal amplitude.

19. An inductive sensor, comprising:
a first measurement path associated with determining a position of a first object based on a first set of input signals;
a second measurement path associated with determining a position of a second object based on a second set of input signals;
an amplitude regulation path associated with regulating amplitudes of a set of output signals; and
a safety path associated with assessing functionality of at least one of the first measurement path, the second measurement path, or the amplitude regulation path.

20. The inductive sensor of claim 19, wherein the first measurement path, the second measurement path, the amplitude regulation path, and the safety path are integrated on a monolithic semiconductor device.

* * * * *